United States Patent
Rosen et al.

(10) Patent No.: US 6,470,187 B1
(45) Date of Patent: Oct. 22, 2002

(54) MULTI-BASE STATION CORDLESS TELEPHONE

(76) Inventors: Howard Rosen, 5756 Royalmount Avenue, Montreal, Quebec (CA), H4P 1K5; Leonard Rosen, 5756 Royalmount Avenue, Montreal, Quebec (CA), H4P 1K5

( * ) Notice: Subject to any disclaimer, the term of this patent is extended or adjusted under 35 U.S.C. 154(b) by 0 days.

(21) Appl. No.: 09/908,789

(22) Filed: Jul. 18, 2001

(51) Int. Cl.[7] ............................................... H04Q 7/20
(52) U.S. Cl. .................... 455/465; 455/426; 455/445; 455/462
(58) Field of Search ............................... 455/462, 465, 455/552, 553, 554, 433, 406, 445, 426

(56) References Cited

U.S. PATENT DOCUMENTS

| | | | |
|---|---|---|---|
| 6,058,316 A | 5/2000 | Takahashi | |
| 6,141,560 A | 10/2000 | Gillig et al. | |
| 6,208,868 B1 * | 3/2001 | Kim | 455/463 |
| 6,226,527 B1 * | 5/2001 | Dalsgaard | 455/553 |
| 6,285,870 B1 * | 9/2001 | Lorieau | 455/411 |
| 2001/0007820 A1 * | 7/2001 | Do | 455/463 |
| 2001/0009845 A1 * | 7/2001 | Feuchtinger et al. | 455/3.05 |
| 2001/0031645 A1 * | 10/2001 | Jarrett | 455/552 |

* cited by examiner

Primary Examiner—Daniel Hunter
Assistant Examiner—Nick Corsaro

(57) ABSTRACT

The present invention is a system of at least one cordless telephone, a home base station and at least one non-home base station. A roaming cordless telephone out of range of its home base station will use a non-home base station to direct digital mode signals to its home base station. The home base station will convert the digital mode signals to analog signals and communicate them with the telephone network. Only a single direct line connection is needed for the home base station, as the digital mode signals and the analog signals communications do not interfere with each other. The user may potentially avoid long distance charges by using the non-home base station as a conduit while using the home base station as the telephone network site for long distance charge accrual. Further, the necessity for using a cellular telephone with the consequent charges is avoided.

12 Claims, 3 Drawing Sheets

MULTI-BASE STATION CORDLESS TELEPHONE

BACKGROUND OF THE INVENTION

The present invention relates to cordless telephones operating from base stations which are connected to conventional telephone systems. More particularly, the present invention relates to the field of cordless telephones that may operate with an effective, connection to a conventional telephone system when the cordless telephone is out of range of its base station.

There is an ongoing need for a communication system in which out of range operation for a cordless telephone can be achieved to thus eliminate the necessity for employing a cellular telephone (with the consequent cost) or the use of the telephone connection of another party.

SUMMARY OF THE INVENTION

The present invention is a cordless telephone that can place, receive or continue processing of telephone calls, whether or not the cordless telephone is in range of its home base station. When out of range of its home base station, the cordless telephone of the subject invention transmits or receives digital mode signals with a non-home base station. Those transmitted or received digital mode signals are routed in one of several possible methods between the cordless telephone and its home base station, wirelessly or by wired connection.

The home base station receives the transmitted digital mode signals from a non-home base station, translates them to analog or other digital (i.e, such as ISDN) or data signals and transmits them to a home telephone line. The home base station may also receive analog or other digital (i.e, such as ISDN) or data signals from the telephone line, translate them to digital mode signals and transmit them to the non-home base station for retransmission to the cordless telephone.

A non-home base station can wirelessly route digital mode signals to the home base station, or vice versa. The wireless routing can be direct or indirect.

Direct wireless routing has a non-home base station in wireless range of a home base station. The digital mode signals are directly exchanged between those two base stations. This means that the cordless phone is out of range of its home base station but in range of the non-home base station.

Indirect wireless routing uses additional, intervening non-home base stations. A first non-home base station is out of range of the home base station but in range of a second non-home base station. The second station is either in range of the home base station or in range of a third non-home station. If in range of the home base station, the second station acts as a wireless link from the first non-home base station to the home base station. Other intervening non-home base stations can act as additional wireless links to span the distance between the first non-home base station and the home base station.

As long as one or more non-home base stations have overlapping wireless communication ranges between the cordless phone and the home base station, the user can move freely out of range of the home base station without service interruption. More importantly, the user can conceivably avoid cellular or telephone network charges for wireless communication from the cordless phone to the home base station. The invention wireless routing can be made without devoting new wireless bandwidth to its operation. Most locations in the world have cordless phone bandwidth already segregated for that purpose apart from cellular or other uses.

For effective wireless routing, the user can strategically locate his own non-home base stations within wireless range of each other over a desired area. Or the user can depend on non-home base stations located in and operating as parts of the base stations of other invention cordless phones. A new user gets their own uniquely addressed cordless phone and home base station and installs the home base station at a desired location. That new base station has means for acting as a non-home base station for another cordless phone uniquely addressed to a different home base station. Each new home base station installation at the desired location of a new user becomes an extension of the effective wireless operating range of the invention system.

Such call processing of the invention cordless telephone through a non-home base station does not substantially affect call processing of a second telephone that can use the non-home base station as the second telephone's home base station.

Digital mode, as used herein, describes a digital transmission and reception technology signal, i.e., TDMA, E-TDMA, narrow band CDMA, and broadband CDMA, spread spectrum, or other appropriate mode that may be transmitted on a channel. In an optional mode, the cordless telephone may employ a direct wire connection with a non-home base station for processing. The subject system allows the cordless telephone user to roam away from his home base station to the range of another base station and transmit and receive in digital mode to the other base station without interfering with the local analog operation of the other base station. This aspect of non-interference or line sharing is entirely novel to the art.

For the out of range or roaming cordless telephone, digital mode signals are exchanged by a roaming cordless telephone at a signal-separable frequency than that of the one or more cordless telephone handsets for the other base station so the signals do not interfere with each other. In one of several methods of routing transmission from a roaming cordless telephone, a received signal from the out of range cordless telephone is received by the other base station and transmitted from the other base station to the home base station for translation to analog or other appropriate signals (such as for data communications).

The digital mode signals sent by the other base station are of course transmitted on the same conventional telephone network connection (land line, wireless or other means, referred to hereafter just as "land line ") used by the other station for its own analog or other communications with a telephone network. The concurrent operation of the subject system and the normal operation of the other base station takes place so that the integrity of the normal operation of the other base station is at least its substantially maintained. Although complete absence of interference by line sharing would be preferable, the owner of the other base station may well accept a reduced performance of normal operation if in exchange for being part of the invention system and to share in its benefits.

In further explanation of the subject system, digital mode transmissions (and received signals as well) enter the land lines of the other base station from the other base station for handling in one of several modes of routing to the home base station. The digital mode transmissions may be received by the telephone network with unique identifier(s) indicating that the signals or packets must be directed to the home base station.

In an alternate embodiment, the other base station and its associated telephone account may be equipped with broad band communications technology, such as for DSL communications, permitting co-transmission of the digital mode signals with the normal operation of the other base station telephone line, although using some of the bandwidth of the telephone account for the other base station. In another alternate embodiment, the digital mode signals may be transmitted directly to the home base station without requiring processing by the telephone network. In one or more of these transmission (and/or receiving) methods for digital mode signals from the other base station to the home base station, the digital mode signals are delivered to the home base station.

The home base station incorporates apparatus for receiving these transmissions. in a manner such that it does not substantially impair the normal land line operation. The normal land line operation may include exchange of signals in analog or other digital (i.e., such as ISDN and the like) and data signals. Analog signals are needed for phone speaker and microphone operation. The home base station, upon receiving a digital mode signal from the roaming cordless telephone (for example, the first number of a desired telephone number that the user wants to call) moves the home base station to an off-hook state and transmits the transformed digital mode signal (now in analog or other digital (i.e, such as ISDN) form) to the telephone network for appropriate processing. Each subsequent number received from the roaming cordless telephone causes the telephone network to respond as if the cordless telephone were within its home base station range. When a dial up attempt is completed, the roaming cordless telephone receives communications signals in the reverse order, i.e., the home base station receives an analog signal from a telephone network source, the analog signal is,translated to a digital mode signal, the digital mode signal is transmitted to the other base station, the other base station transmits the non-analog signal to the roaming cordless telephone, and the roaming cordless telephone transforms the non-analog signal to an analog signal that may result in an audible or data output usable by the roaming cordless telephone holder.

These simple concepts eliminate the need for an out of range base station with a land line committed only to reception and transmission of signals from the roaming cordless handset. The prior art contains many examples of cordless telephones that switch to a cellular network when out of range of home base station. The present invention system is not one of that category.

The present invention may incorporate a feature for timing out in a standby mode for a period of time if the roaming cordless telephone moves out of range of any receptive base station, so that the user traveling in a car or other transport may not lose communication contact with the connected telephone number during a call. The out of range base station can. be a telephone with similar capabilities as that of the home base station, providing inducement for many user's in a locality (corporate building or campus small community or other relatively compact geographical area) to install the subject cordless telephone so that they may have the benefit of out of range operation without the need to pay for a cellular network call.

It is well known that cellular network calls are many times more expensive than those from a single land line telephone. The subject system having at least one cordless telephone and two or more. base stations permits the user to place and receive calls from out of range locations where the only charges that will accrue to the user will be those that would have accrued had the user been within range of the home base station.

The frequencies for a roaming cordless telephone and that set aside for the local cordless telephone preferably operate within the broad ranges set aside for the spread spectrum technology of the 900 MHz and 2.4 GHz cordless telephones. It is well known from the cellular telephone art and the cellular—cordless telephone art that one of several frequencies may be programmably selected by the invention cordless telephone so that its communication frequency does not interfere with the communications of a local. base station as opposed to the home base station of the roaming cordless telephone. It is also well known in the cellular telephone art and the cellular—cordless telephone art that base station range sensing expedients and range to range "hand-off" expedients presently exist for relatively simple incorporation into the subject system so a roaming cordless telephone can move out of range of one of the other base stations and automatically transfer all communication exchanges with a nearby or adjacent-range base station. Optionally, the user can be given a visual or audible signal that the roaming cordless telephone is moving out of and/or into range of another base station. Such signal will alert the user that their call may be terminated if another base station range is not at least nearby.

DETAILED DESCRIPTION OF THE INVENTION

Figure 1:
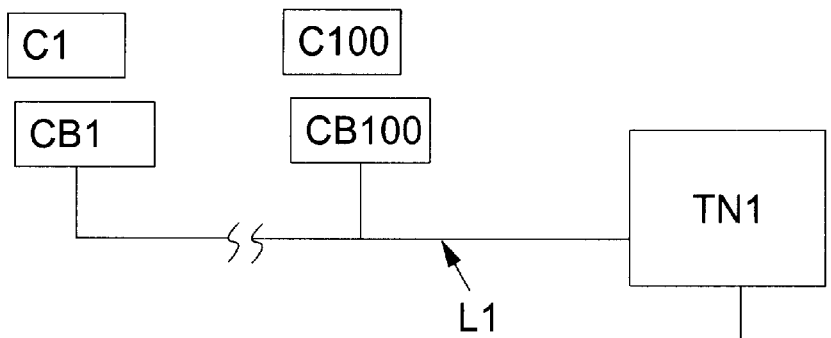
FIG. 1 is a block diagram of a cordless telephone C1 within operating range. of its home base station CB1, showing other base stations and cordless telephones according to the invention connected by land lines to a telephone network.
Figure 1:
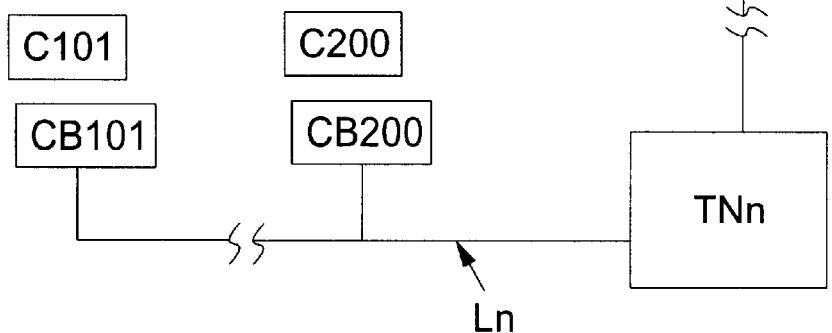

The subject system incorporates at least one cordless telephone and two or more base stations. The functions of an exemplary cordless telephone and the base stations are now discussed in more detail.

A cordless telephone in accordance with preferred embodiments of the present invention will have a transmit/receive circuit (with antenna(s)) operationally connected with programmable circuitry to select a transmit/receive frequency according the objects of the invention. The programmable circuitry may include a central processing unit connected to one or more forms of memory for directing and controlling the cordless telephone functions as required herein. As controlled by the programmable circuitry, a modem circuit can demodulate received radio signals into a continuous signal stream, which will be able to be decoded by the coder/decoder (CODEC) into an audio signal which is controllably amplified by an interface controller and output through a telephone speaker. Likewise, a reverse path is followed through the cordless telephone as the telephone microphone detects user speech. A keypad and a display provide conventional user input and output. Or more simply, as shown in cordless telephones C1 and C100 of FIG. 4, respective input/output circuitry 201 and 204 includes wireless transmission and reception apparatus in connection with logic 205 and 208 as well-as analog user interface 209 and 212.

Each cordless telephone is identified to a base station by a unique identifier. As in FIG. 4, the base stations CB1 and CB100 respectively include input/output coupling circuitry 202 or 203 for connection by direct land line with the public telephone network or other telephone network. Base stations CB1 and CB100 also respectively incorporate logic 206 and 207 and analog user interfaces 210 and 211.

The ability to switch between invention base stations may be accomplished with known range sensing and hand-off technology which use an over-air protocol as with a mobile telephone system, such as a Personal Communication System (PCS) with hand-held telephones in a cellular communication system or any cellular or mobile telephone system. The protocol defines a method in which user stations, such as cellular or mobile telephone handsets, communicate with one. or more base stations to place and receive telephone calls. The protocol provides air-channel agility between base stations and user stations. Each base station may simultaneously maintain communication with as many user stations as there are air channels in its polling loop. The ability of a user station to communicate on any unoccupied air channel makes the protocol air-channel agile. Each base station continually transmits on each one of its air channels in a predetermined sequence.

The ability and technology of a single circuit to conduct multiple simultaneous conversations through identical and closely coupled media without substantial interference are well known in the art. The present invention uses such technology for transmission, along the same land lines, the digital mode signals of the roaming cordless telephone and the analog signals from the cordless or other telephone of the local base station.

FIG. 1 shows a set of base stations C1 to C100 according to the invention connected by land line L1. Those base stations are connected without an intervening first switching telephone network TN1. Similarly, a set of the subject base stations C101 to C200 are connected by land line Ln. Those base stations are connected without an intervening first switching telephone network TNn. The set of telephone networks TN1 to TNn represent a worldwide communication telephone network in which base stations according to the invention are capable of land line connection thereto for analog or other communication with any other effectively connected user of the worldwide communication telephone network. FIG. 1 shows only invention base stations in the worldwide communication telephone network.

The subject base stations each have unique station identifiers matching those programmed into programmable circuitry in the cordless telephones associated with them as in FIG. 1, i.e., cordless telephone C1. transmits in an analog or data mode directly with base station CB1 when it is within its range. For a typical cordless telephone-operating at 900 MHz or 2.4 GHz, that range may be anywhere from a 10–20 feet to hundreds of feet. It is within skill in the art with this disclosure to provide greater operating range of one or more of the subject base stations as desired and/or as permitted by regulation. No other base station will receive analog or data communication from cordless telephone C1 other than base station CB1, for example.

Figure 2:
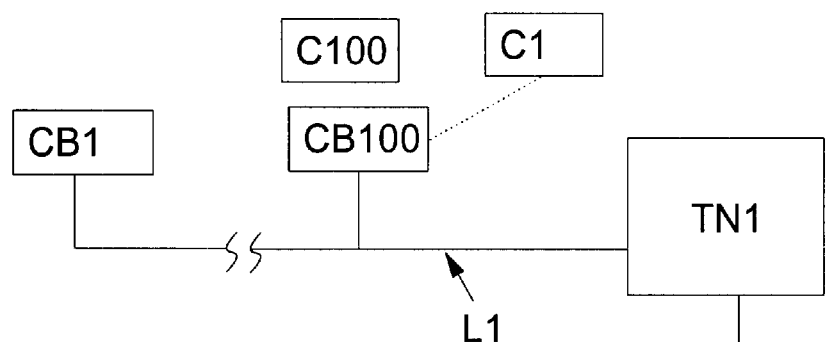
FIG. 2 is a block diagram of a cordless telephone C1 outside of operating range of its home base station CB1, showing other base stations and cordless telephones connected by land lines to a telephone network.
Figure 2:
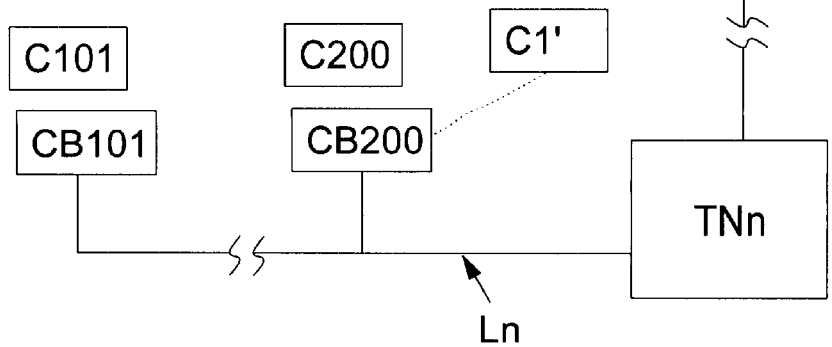

FIG. 2 shows cordless telephone C1 out of range of its home base station, base station CB1, but within range of a non-home base station, base station CB100. Non-home base station CB100 optionally has uniquely addressed to it a cordless telephone C100. A non-home base station CB100 routing digital mode signals wirelessly on path 215 doesn't need a telephone network connection path 216 for the invention system to work. Path 216 may exist in that circumstance so that station CB100 can act as a base station for cordless phone C100. A line is shown connecting cordless telephone C1 with base station CB100, which has a different station identifier than that of telephone C1. Base station CB100 cannot accept analog or data signals communicated by telephone C1. The base station incorporates standard cordless telephone circuitry with an additional transmit/receive circuit operatively connected with programmable circuitry which is turn is operatively connected with the land line connection of the base station to accomplish the objects of the invention.

The transmit/receive circuitry and programmable circuitry are adapted to permit transmit/receive functions of the subject system for more than one roaming cordless telephone. Where more than one cordless telephone is within range of a non-home base station, the programmable circuitry of the roaming cordless telephones and the non-home base station will operate to transmit/receive at separate frequencies for the roaming cordless telephones and operate on the digital mode signals of the multiple roaming cordless telephones as if they were different subscriber lines. Non-home base stations (as to telephone C1) in the positions of base stations CB2 to CB100 may be capable of the transmit/receive functions for digital mode signals of the roaming cordless telephone to the home base station directly without intervening routing through the telephone network, as a portion of public telephone network TN1. More specifically, for a set of entirely local direct connection base stations as in base stations CB1 to CB100 (or the separate set of base stations CB101 to CB200), the several cordless telephones identified to their home base stations may roam from the range of their home base stations to the ranges of the local set of non-home base stations and be operatively connected with the home base station without intervening routing to the local telephone network.

Figure 3:
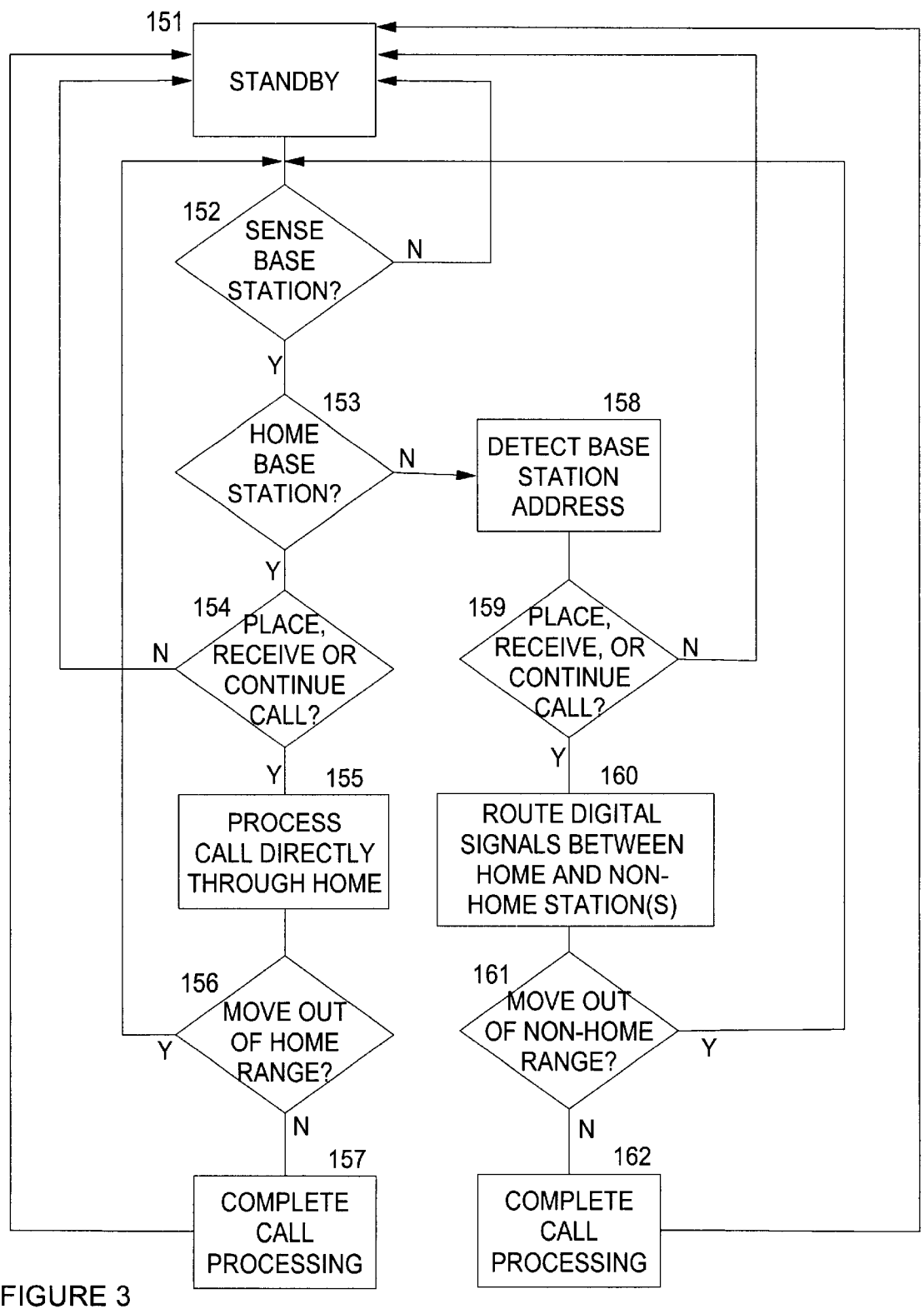
FIG. 3 is a flow chart of functions for the subject cordless telephone system.

The invention is now discussed with reference to the flow chart of FIG. 3. Step 151 shows a first cordless telephone in a standby mode, thereafter performing step 152 of sensing for the range of a base station. If a base station is not sensed, the standby mode is maintained for a desired period of time. If a base station is sensed, step 153 is performed with communication established between the first cordless telephone and the base station to determine if the base station is the home base station of the first cordless telephone.

If a home base station is sensed in step 153, the first cordless telephone is thereafter in a state to place, receive or continue a call as in step 154. If a call is not placed, received or continued, the first cordless telephone is placed in a standby mode for a period of time. If a call is placed, received or continued, the first cordless telephone processes the call directly through its home base station as in step 155. If the first cordless telephone moves out of range of its home base station, it is returned to the state of step 152 to sense for a base station, otherwise the call processing is completed as in Step 157 and the first cordless telephone is returned to a standby mode in Step 151.

If at step 153 the first cordless telephone did not sense the home base station, it detects the non-home base station and its address in step 158. The first cordless telephone is moved to a state to place, receive or continue calls in step 159. If a call is not placed, received. or continued, the first cordless telephone is placed in the standby mode of step 151. If a call is placed, received or continued, the first cordless telephone will transmit and receive digital signals as in step 160 to a non-home base station. This routing between the non-home and home base stations can be wireless or by wired connection. Digital mode signals are routed directly or indirectly to the home base station uniquely addressed to the roaming cordless telephone. The routing may use one or more intervening non-home base stations to connect the cordless phone with the home base station.

Figure 4:
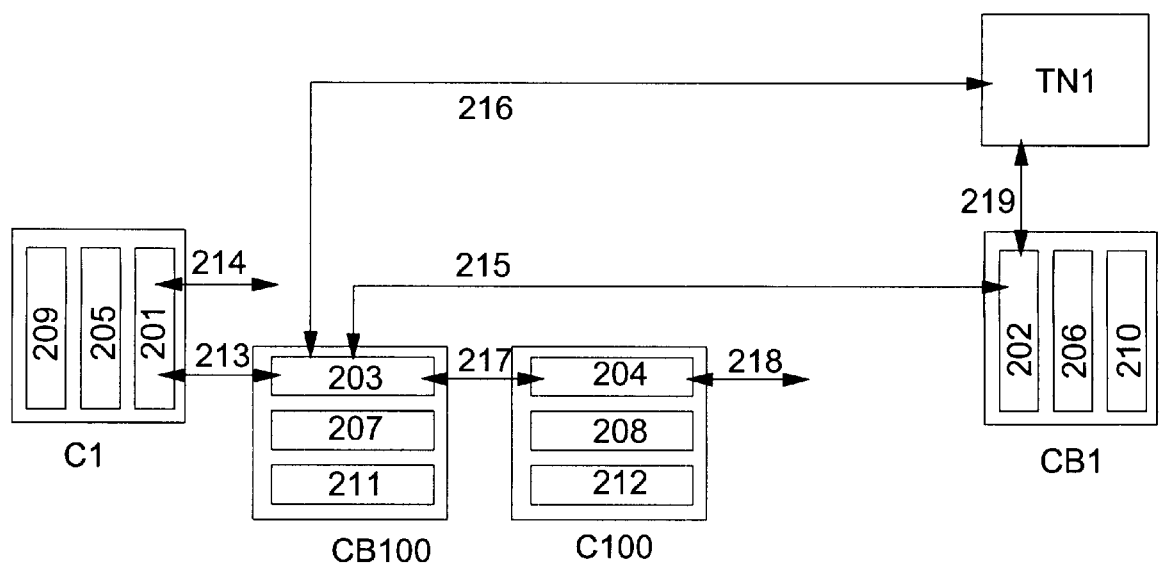
FIG. 4 is a diagram of two cordless telephones and their respective base stations showing wireless connection of one cordless telephone to a non-home base station in accordance with the present invention.

As a graphic example of the forms of routing, FIG. 4 shows wireless routing along path 215 between a non-home base station at CB100 and a home base station at CB1. FIG. 4 also shows wired routing along path 216 between the non-home base station at CB100 and a. home base station at CB1, with an optional routing through network TN1 and path 219.

In a wireless routing operation as shown in FIG. 4, non-home base station CB100 has means for sensing if it is in wireless range of another base station and determining whether that other base station is the home base station of phone C1 or if it is in wireless range of a non-home base station as to phone C1. Routing along path 215 is wirelessly established if non-home base station CB100 senses home base station CB1 for phone C1. If non-home base station CB100 senses only one or more non-home base stations, non-home base station CB100 directs a control signal to those other non-home base stations to sense as it has just done for wireless range to home base station CB1 or to yet another non-home base station. Thus, an intervening non-home base station has means for receiving such a control signal, acting upon it to sense wireless range to other base stations and routing digital mode signals as an intervening link when the connection is ultimately made between non-home base station CB100 and CB1.

If the first cordless telephone moves out of range of the non-home base station with which it exchanges digital signals, as in step 161, the telephone is returned to the base station sensing step 152 for appropriate connection with a home base station or non-home base station. If in step 161 the first cordless telephone remains within the range of the non-home base station; the call processing is completed as in step 162, and thereafter the first cordless telephone is returned to the standby state.

It is important that the present invention not be perceived as being especially limited to the routing process of digital signals between a home base station and a non-home base station exchanging digital signals with a cordless telephone addressed to that home base station. Such digital signals may be routed directly by wire or wireless connection, through a local telephone network, through a public telephone network, through one or more of a sequence or network of non-home base stations, or other such configuration.

The above options will sometimes present the skilled artisan with considerable and wide ranges from which to choose appropriate apparatus and method modifications for the above examples. However, the objects of the present invention will still be obtained by that skilled artisan applying such options in an appropriate manner.

We claim:

1. A system for completing a cordless phone call through a cordless subscriber's home base station via a non-home base station including at least one cordless telephone uniquely addressed to a home base station comprising:

(a) at least one non-home base station;
    (b) the home base station having telephone line connection to a telephone network by direct connection and a unique address;
    (c) the cordless telephone having means for analog signal input, converting analog signal input to digital mode signals, and wirelessly transmitting those digital mode signals with said unique address to a non-home base station when the cordless telephone is out of range of its home base station;
    (d) each non-home base station having means for routing digital mode signals from a cordless telephone uniquely addressed to a home base station, wherein said means for routing comprises means for wirelessly receiving said digital mode signals, means for correlating the transmitted unique address to the home base station, and a means for:
        (i) wirelessly routing said digital mode signals to said home base station based on said unique address if a given non-home base station receiving said digital mode signals is within range of said home base station, and,
        (ii) if said given non-home base station is not within range of said home base station, wirelessly routing said digital mode signals to at least one additional non-home base station, thereby eventually routing the digital mode signals to said home base station based on said unique address; and
    (e) said home base station having means for wirelessly receiving the routed digital mode signals, means for identifying the unique address of the cordless phone, and a means for completing said call through the direct line connection by using the digital mode signals received from said non-home base station.

2. The system of claim 1 wherein at least one of the non-home base stations is also a home base station uniquely addressed for a second cordless telephone.

3. The system of claim 1 wherein at least one non-home base station is capable of communication with another telephone line in the public telephone network.

4. The system of claim 3 wherein at least one non-home base station is capable of communication with another telephone line in the public telephone network at the same time as the transmission of digital mode signals to a home base station from a cordless telephone.

5. The system of claim 1 wherein each home base station has means for converting received digital mode signals to analog or digital or data signals.

6. The system of claim 5 wherein each home base station has means for transmitting to another telephone line in the public telephone network the analog signals converted from digital mode signals.

7. The system of claim 6 wherein each home base station has means for receiving analog, digital or data signals from a live telephone line to the public telephone network, converting those analog, digital or data signals to digital mode signals and transmitting them to a non-home base station having means for sending the digital mode signals wirelessly to a cordless telephone uniquely addressed to the home base station.

8. The system of claim 7 wherein each cordless telephone has means for wirelessly receiving digital mode signals sent from a non-home base station such that only digital mode signals from a cordless telephone's home base station are further processed.

9. The system of claim 7 wherein each cordless telephone has means for wirelessly receiving digital mode signals sent from a non-home base station and transforming those signals to analog signals such that a user of the cordless telephone may receive communication thereby.

10. The system of claim 7 wherein at least one non-home base station has means for transmitting to and receiving from digital mode signals from more than one cordless telephone out of range of their respective home base stations and respectively receiving, from and transmitting to the direct line those digital mode signals such that each set of digital mode signals from each out of range cordless telephone is effectively exchanged with its home base station without interference with the other digital mode signals transmitted on the same direct line.

11. A system for completing a cordless phone call through a cordless subscriber's home base station via a non-home base station including at least one cordless telephone uniquely addressed to a home base station comprising:

(a) the cordless telephone having a unique address;

(b) the home base station having telephone line connection to a telephone network by direct connection and means for input from the telephone network, converting input from the telephone network to digital mode signals, and wirelessly transmitting those digital mode signals with said unique address to a non-home base station when the cordless telephone is out of range of its home base station;

(c) at least one non-home base station, each having means for routing digital mode signals from the home base station uniquely addressed to its cordless telephone, wherein said means for routing comprises means for wirelessly receiving said digital mode signals, means for correlating the transmitted unique address to the cordless telephone, and a means for selectively:

(i) wirelessly routing said digital mode signals to said cordless telephone based on said unique address if a given non-home base station receiving said digital mode signals is within range of said home base station, and, (ii) if said given non-home base station is not within range of said home base station, wirelessly routing said digital mode signals to at least one additional non-home base station, thereby eventually routing the digital mode signals to said cordless telephone based on said unique address; and (d) the cordless telephone further having means for wirelessly receiving the routed digital mode signals, means for identifying the unique address of the home base station, and a means for completing said call through the direct line connection by using the digital mode signals received from said non-home base station.

12. A system for completing a cordless phone call through a cordless subscriber's home base station via a non-home base station including at least one cordless telephone uniquely addressed to a home base station comprising:

(a) at least one non-home base station;

(b) the home base station having telephone line connection to a telephone network by direct connection and a unique home address;

(c) the cordless telephone having a unique handset address, means for analog signal input, converting analog signal input to digital mode signals, and wirelessly transmitting those digital mode signals with said unique home address to a non-home base station when the cordless telephone is out of range of its home base station;

(d) the home base station further having means for input from the telephone network, converting input from the telephone network to digital mode signals, and wirelessly transmitting those digital mode signals with said unique handset address to a non-home base station when the cordless telephone is out of range of its home base station;

(e) each non-home base station having means for routing digital mode signals from said cordless telephone to its home base station and means for routing digital mode signals from said home base station to its cordless phone, wherein said means for routing comprises means for wirelessly receiving said digital mode signals, means for correlating the transmitted unique home address to the home base station, means for correlating the transmitted unique handset address to the cordless telephone and a means for selectively:

(iii) wirelessly routing said digital mode signals to said home base station based on said unique address if a given non-home base station receiving said digital mode signals is within range of said home base station, and, if said given non-home base station is not within range of said home base station, wirelessly routing said digital mode signals to at least one additional non-home base station, thereby eventually routing the digital mode signals to said home base station based on said unique home address; and (iv) wirelessly routing said digital mode signals to said cordless telephone based on said unique handset address if a given non-home base station receiving said digital mode signals is within range of said cordless telephone, and, if said given non-home base station is not within range of said cordless telephone, wirelessly routing said digital mode signals to at least one additional non-home base station, thereby eventually routing the digital mode signals to said cordless telephone based on said unique handset address; and (f) said home base station and cordless telephone having means for wirelessly receiving the routed digital mode signals, means for identifying the received unique address, and a means for completing said call through the direct line connection by using the digital mode signals received from said non-home base station.

* * * * *